US012670926B2

(12) United States Patent
Angkititrakul et al.

(10) Patent No.: US 12,670,926 B2
(45) Date of Patent: Jun. 30, 2026

(54) SYSTEMS AND METHODS FOR ENHANCED DATA GENERATION IN FAULT DIAGNOSIS

(71) Applicant: Robert Bosch GmbH, Stuttgart (DE)

(72) Inventors: Pongtep Angkititrakul, Dublin, CA (US); Long Huang, Baton Rouge, LA (US); Jonathan Francis, Pittsburgh, PA (US); Samarjit Das, Wexford, PA (US)

(73) Assignee: Robert Bosch GmbH (DE)

( * ) Notice: Subject to any disclaimer, the term of this patent is extended or adjusted under 35 U.S.C. 154(b) by 157 days.

(21) Appl. No.: 18/796,377

(22) Filed: Aug. 7, 2024

(65) Prior Publication Data

US 2026/0045272 A1 Feb. 12, 2026

(51) Int. Cl.
*G10L 17/18* (2013.01)
*G10L 25/27* (2013.01)
*G10L 25/51* (2013.01)

(52) U.S. Cl.
CPC .............. *G10L 25/51* (2013.01); *G10L 25/27* (2013.01)

(58) Field of Classification Search
None
See application file for complete search history.

(56) References Cited

U.S. PATENT DOCUMENTS 10,666,216 B2 5/2020 Bongiovi
11,173,399 B2 11/2021 Chrzanowski, Jr.
12,477,196 B1 * 11/2025 Goyal ................ H04N 21/8549
2020/0183035 A1 6/2020 Liu
2024/0412720 A1 * 12/2024 Vasylyev .......... G06F 16/90332
2025/0046316 A1 * 2/2025 Rose ........................ G10L 17/18

FOREIGN PATENT DOCUMENTS

CN 110567720 12/2019
CN 118053450 A 5/2024
(Continued)

OTHER PUBLICATIONS

Extended European Search Report for EP 25194499.7, Dated Dec. 2, 2025, 10 Pages.
(Continued)

*Primary Examiner* — Jakieda R Jackson
(74) *Attorney, Agent, or Firm* — Dickinson Wright PLLC

(57) ABSTRACT

A method of generating audio to obtain manipulated audio data includes receiving textual descriptions of audio associated with operation of a device, receiving audio data associated with the operation of the device, generating, based on the textual descriptions, descriptive text inputs of audio features associated with the operation of the device, generating the manipulated audio data based on the descriptive text inputs and the audio data, the manipulated audio data including the one or more audio features indicative of faults associated with the descriptive text inputs, training a machine learning (ML) model to diagnose the faults using the manipulated audio data, the ML model being trained to generate an output indicative of the faults based on audio data obtained during the operation of the device, and, based on convergence during the training, outputting a trained ML model configured to generate the output indicative of the faults.

20 Claims, 12 Drawing Sheets

(56) References Cited

FOREIGN PATENT DOCUMENTS

| | | | |
|---|---|---|---|
| JP | 2018537727 | A | 12/2018 |
| KR | 102509699 | B1 | 3/2023 |

OTHER PUBLICATIONS

Hao Zhou et al., "Anomaly Sound Detection of Industrial Equipment Based on Incremental Learning." CCA Symposium on Fault Detection, Supervision and Safety for Technical Processes (SafeProcess) 2023, 6 Pages.
Hejing Zhang et al., "First-Shot Unsupervised Anomalous Sound Detection With Unknown Anomalies Estimated By Metadata-Assisted Audio Generation." ICASSP 2024, IEEE International Conference on Acoustics, Speech and Signal Processing, pp. 1271-1275.
Bommasani, Rishi, et al. "On the opportunities and risks of foundation models." arXiv preprint arXiv:2108.07258 (2021).
Elizalde, Benjamin, et al. "Clap learning audio concepts from natural language supervision." ICASSP 2023-2023 IEEE International Conference on Acoustics, Speech and Signal Processing (ICASSP). IEEE, 2023.
Gao, Xin, Fang Deng, and Xianghu Yue. "Data augmentation in fault diagnosis based on the Wasserstein generative adversarial network with gradient penalty." Neurocomputing 396 (2020): 487-494.
Lyu, Pin, et al. "A novel model-independent data augmentation method for fault diagnosis in smart manufacturing." Procedia CIRP 107 (2022): 949-954.
Oh, Jin Woo, and Jongpil Jeong. "Data augmentation for bearing fault detection with a light weight CNN." Procedia computer science 175 (2020): 72-79.
Wu, Yusong, et al. "Large-scale contrastive language-audio pretraining with feature fusion and keyword-to-caption augmentation." ICASSP 2023-2023 IEEE International Conference on Acoustics, Speech and Signal Processing (ICASSP). IEEE, 2023.

* cited by examiner

SYSTEMS AND METHODS FOR ENHANCED DATA GENERATION IN FAULT DIAGNOSIS

TECHNICAL FIELD

The present disclosure relates to artificial intelligence techniques for generating data for fault diagnosis.

BACKGROUND

Various systems are configured to perform tasks using machine learning (ML) or other artificial intelligence (AI) techniques. For example, systems configured to perform image or sound recognition, object detection, and/or other automated tasks may implement AI techniques. As one example, audio or sound detection systems and methods use various detection models trained for fault detection/diagnosis.

SUMMARY

A method of generating audio to obtain manipulated audio data that includes one or more audio features indicative of faults includes, at one or more processing devices, receiving textual descriptions of audio associated with operation of a device, receiving audio data associated with the operation of the device, generating, based on the textual descriptions, descriptive text inputs of audio features associated with the operation of the device, the descriptive text inputs including at least one of audio characteristics of faults associated with the operation of the device, contextual information associated with the operation of the device, and conditions associated with the operation of the device, generating the manipulated audio data based on the descriptive text inputs and the audio data, the manipulated audio data including the one or more audio features indicative of faults associated with the descriptive text inputs, training a machine learning (ML) model to diagnose the faults using the manipulated audio data, the ML model being trained to generate an output indicative of the faults based on audio data obtained during the operation of the device, and, based on convergence during the training, outputting a trained ML model configured to generate the output indicative of the faults.

Other embodiments include a non-transitory computer readable storage medium configured to store instructions that, when executed by a processor included in a computing device, cause the computing device to carry out the various steps of any of the foregoing methods. Further embodiments include systems, controllers, computing devices, etc. configured to carry out the various steps of any of the foregoing methods. Further embodiments include a machine that is configured to carry out the various steps of any of the foregoing methods.

Other aspects and advantages of the invention will become apparent from the following detailed description taken in conjunction with the accompanying drawings that illustrate, by way of example, the principles of the described embodiments.

DETAILED DESCRIPTION

Figure 1:
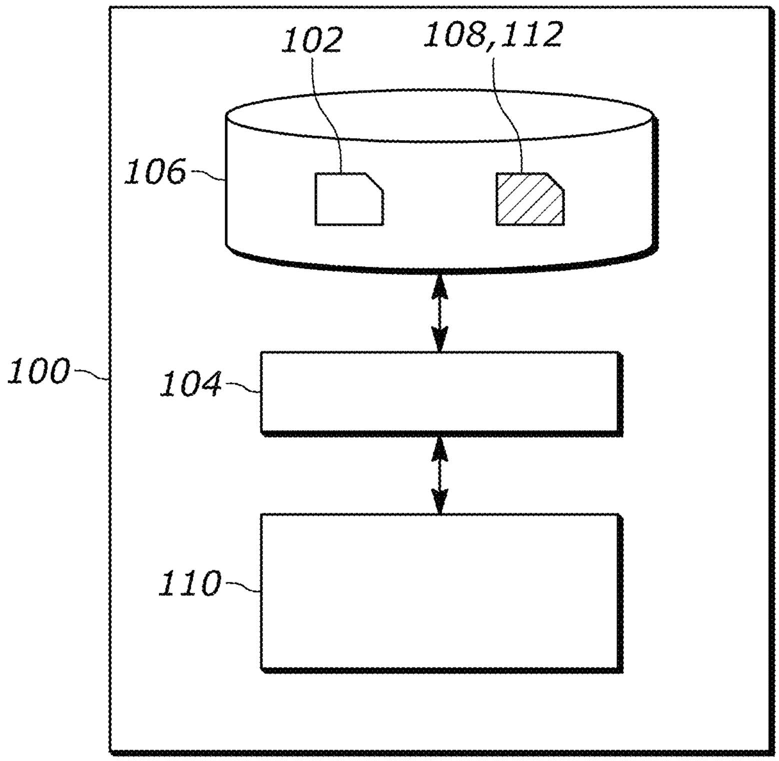
FIG. 1 generally illustrates a system for training a machine learning model according to the principles of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

As used herein, "content" may refer to original content corresponding to the input data (e.g., data representative of a captured sound, image, video, text, etc.) or synthesized content (e.g., a synthesized sound or audio, image, video,, text, etc.). In some examples, "content" may include sounds, which may correspond to captured sounds, synthesized sounds, or combinations thereof. Sounds may be represented by sound data. In some contexts herein, the terms "sound" and "sound data" may be used interchangeably. Similarly, "sound" and "audio" may be used interchangeably. In an example, "sound" and/or "sound data" refer to a raw representation of sound, such as an array of numerical values representing sound levels or volumes, frequencies, etc., which in some examples may include preprocessed data that originated from a sound or audio sensor. Conversely, "metadata" or "sound metadata" may refer to contextual or supplementary details about the sound, such as size, format, creation date, geolocation data, and the like. In various examples, a "sound" and "sound data" may, but do not necessarily, further include metadata.

Various systems are configured to perform tasks using machine learning (ML) or other artificial intelligence (AI) techniques. For example, systems configured to perform image or sound recognition, object detection, and/or other automated tasks may implement AI techniques. As one example, audio or sound detection systems and methods use various detection models trained for fault detection/diagnosis.

In various mechanical systems, operation under harsh conditions can lead to unexpected failures. Accordingly, fault diagnosis for these components is an important aspect of system operation and maintenance. For example, vibration signals are commonly used for diagnosing early failures in bearings and gears, and some techniques may include frequency spectrum analysis and handcrafted fault features coupled with classifiers. However, these approaches are limited by noise and the rapidly growing volume of machine data. This has led to the development of data-driven fault diagnosis, particularly using machine learning (ML) or deep learning (DL) techniques that can automatically extract representations from raw data. Several ML/DL models, including convolutional neural networks (CNNs) and recurrent neural networks such as long short-term memory (LSTM) models, have shown promising results in fault diagnosis. However, most existing ML- or DL-based approaches require adequate fault data, which is often challenging to obtain in industrial applications where faults occur infrequently and briefly.

In some examples, sound or audio-based or acoustic sensing technology may provide cost-effective monitoring and fault diagnosis. Acoustic sensing includes measuring the soundwaves generated by a system or process and using these measurements to estimate other physical quantities. Audio-based sensing provides information about the sound and vibration characteristics of a system, which can be used for detecting faults or anomalies in the system and can be used to improve predictive maintenance models. For example, sensed audio data that includes one or more faults may be different than "healthy" data (data not including any faults, representing "normal" or "healthy" system operation), and different faults may have different audio or acoustic signatures. An acoustic signature can also provide insights into the behavior of the system, such as changes in operating conditions.

One challenge associated with audio-based sensing for fault detection is a limited number of fault samples in audio data (e.g., in a given audio stream). For example, in a given dataset of audio data sensed from a system there is a very large amount of "healthy" data and a very small amount of "fault" data (i.e., sound data or data points indicative of a fault). Accordingly, a very large amount of data must be collected, processed, and analyzed to identify a very small number of faults.

Various techniques, such as transfer learning and data generation techniques, may be used to address the problem of limited fault samples. For example, transfer learning techniques involve using an additional completed dataset to learn and apply knowledge to a target dataset, while data generation techniques focus on generating synthetic samples using oversampling approaches or generative adversarial networks (GANs). GANs may facilitate the learning of distribution characteristics of vibration signals and generating synthetic fault data. However, in industrial applications, the ratio of healthy data to fault data is typically very high, making it difficult to train GANs effectively.

Data (e.g., audio) generation systems and methods according to the present disclosure are configured to implement data (e.g., audio data) generation techniques that include descriptive text-based (or text-guided) audio manipulation, which may be referred to as "data augmentation". For example, text-guided audio manipulation includes using textual input to control and manipulate audio signals. In this manner, audio content can be modified and generated based on text descriptions. Various techniques for text-guided audio manipulation include, but are not limited to, audio style transfer, conditional generative models, and audio effects.

Audio style transfer techniques include modifying the characteristics of an audio signal based on the style or attributes specified in the input text. By leveraging deep learning techniques, such as neural networks and generative models, audio style transfer can transform the timbre, pitch, or emotional content of an audio signal to match the desired text-guided specification.

Conditional generative model techniques include a structured prediction approach that models a full distribution of possibilities over a joint configuration of outputs. These techniques are used in text-guided audio manipulation to generate audio that aligns with given textual prompts. Conditional generative models learn the relationship between text inputs and audio outputs, allowing for the generation of novel audio samples based on specific textual cues.

Audio effects techniques use textual prompts to control audio effects and processing parameters. By specifying desired effects or adjustments in the text, such as reverb, echo, or equalization, algorithms can apply the appropriate audio processing techniques to modify the input audio accordingly. Audio effects techniques enable interactive and expressive manipulation of audio using natural language instructions.

Data augmentation and data generation may require a distribution of existing data for resampling to generate additional data or manual control for adjusting input parameters or features to attain the desired output. These constraints restrict the scope of generated data and limit the ability to create real data for unseen distributions or scenarios. The systems and methods of the present disclosure are configured to implement data generation techniques that incorporate data augmentation by leveraging an extensive array of sources such as online audio, text, and knowledge resources, along with interrelationships between these sources. By providing a textual description of a physical device and contextual elements of the device (including conditions, environment, behaviors, etc.), more data can be generated by manipulating input data that meets specified criteria.

These systems and methods take advantage of the progress of foundational models to capture general nuances, factual knowledge, and contextual understanding, and provide a dynamic foundation for generating coherent, context-sensitive responses. The techniques described herein are adaptable for specific applications, such as text generation, language translation, and question answering, and therefore are suitable for a wide array of tasks.

The audio generation systems and methods of the present disclosure may implement one or more types of models. As one example, a CLAP (Contrastive Language-Audio Pre-training) model includes a neural network trained on a variety of (audio, text) pairs. The model can be instructed to predict the most relevant text snippet or content, given an audio sample, without directly optimizing for the task. For example, the CLAP model may use a shifted window (SWIN) Transformer to obtain audio features from a log-Mel spectrogram input, and may use a Robustly Optimized BERT (Bi-directional Encoder Representations and Transformers) Pre-Training Approach (ROBERTa) model to obtain text features. Both the text and audio features are then projected to a latent space with identical dimensions. The dot product between the projected audio and text features is then used as a similarity score.

As another example, large language models (LLMs) are configured to comprehend and generate human-like text. LLMs are trained on extensive text data to grasp language nuances, enabling coherent responses. LLM benefits include natural language understanding, text creation, and task automation (e.g., customer support, translation, research assistance, personalization, innovation facilitation, educational support, enhancement of creativity across various domains, etc.).

FIG. 1 shows one example system 100 for training of an ML or other AI model, such as an audio generation (or synthesizing) model according to the present disclosure. The system 100 may be configured to (and/or include circuitry configured to) implement the systems and methods of the present disclosure described below in more detail. The system 100 may comprise an input interface for accessing training data 102 for the audio generation model. For example, as illustrated in FIG. 1, the input interface may be constituted by a data storage interface 104 which may access the training data 102 from data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also external data storage, e.g., network-accessible data storage.

In some embodiments, the data storage 106 may further comprise a data representation 108 of an untrained version of the audio generation model which may be accessed by the system 100 from the data storage 106. It will be appreciated, however, that the training data 102 and the data representation 108 of the untrained audio generation model may also each be accessed from different data storage, e.g., via a different subsystem of the data storage interface 104. Each subsystem may be of a type as is described above for the data storage interface 104.

In some embodiments, the data representation 108 of the untrained audio generation model may be internally generated by the system 100 on the basis of design parameters for the audio generation model, and therefore may not explicitly be stored on the data storage 106. The system 100 may further comprise a processor subsystem 110 which may be configured to, during operation of the system 100, provide an iterative function as a substitute for a stack of layers of the audio generation model to be trained. Here, respective layers of the stack of layers being substituted may have mutually shared weights and may receive, as input, an output of a previous layer, or for a first layer of the stack of layers, an initial activation, and a part of the input of the stack of layers.

The processor subsystem 110 may be further configured to iteratively train the audio generation model using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the audio generation model. The processor subsystem 110 is configured to train the audio generation model in accordance with systems and methods of the present disclosure as described below in more detail.

The system 100 may further comprise an output interface for outputting a data representation 112 of the trained audio generation model. This data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' audio generation model may, during or after the training, be replaced, at least in part by the data representation 112 of the trained audio generation model, in that the parameters of the audio generation model, such as weights, hyperparameters and other types of parameters of audio generation models, may be adapted to reflect the training on the training data 102. This is also illustrated in FIG. 1 by the reference numerals 108, 112 referring to the same data record on the data storage 106. In some embodiments, the data representation 112 may be stored separately from the data representation 108 defining the 'untrained' audio generation model. In some embodiments, the output interface may be separate from the data storage interface 104, but may in general be of a type as described above for the data storage interface 104.

Figure 2:
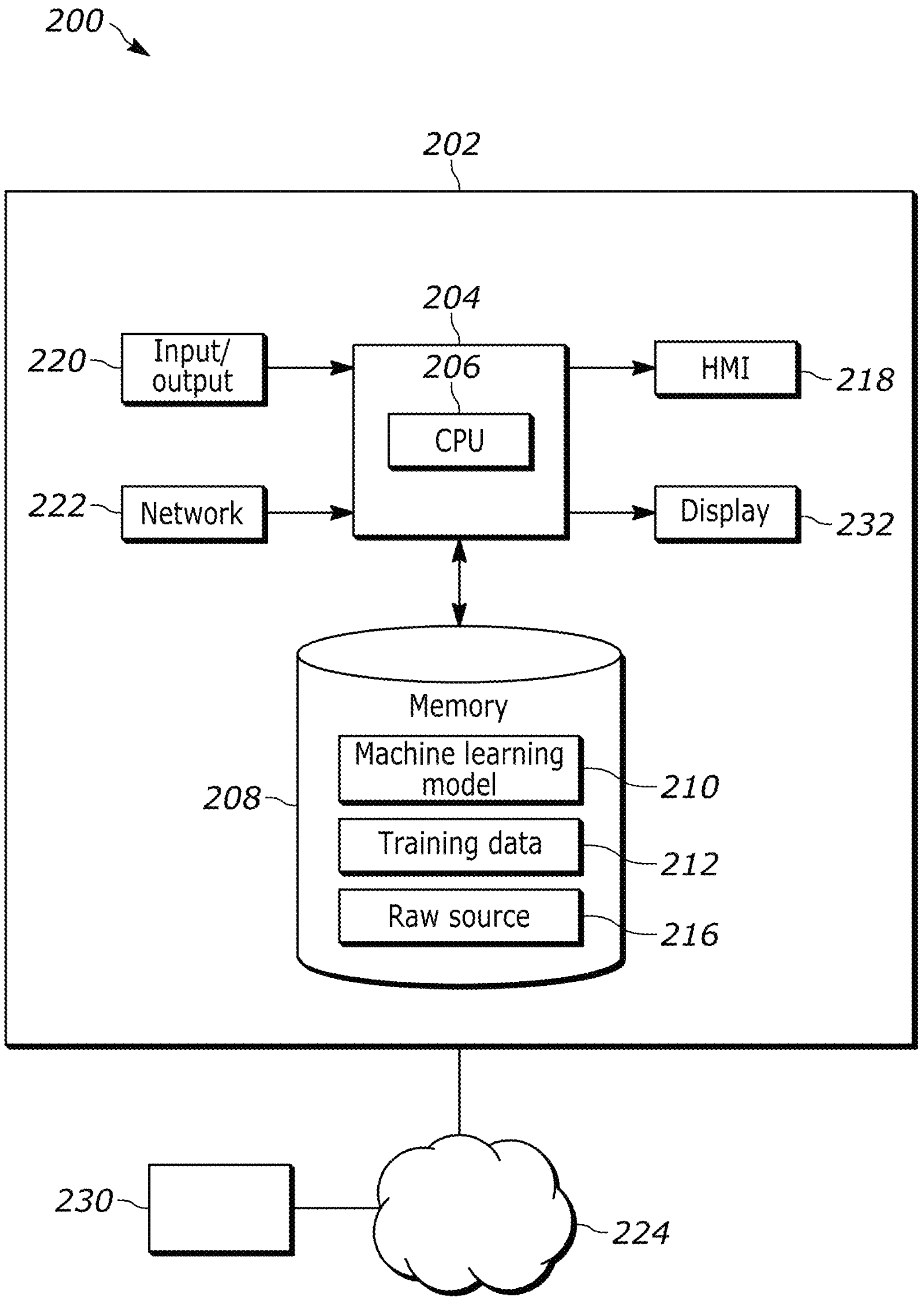
FIG. 2 generally illustrates a computer-implemented method for training and implementing a machine learning model according the principles of the present disclosure.

FIG. 2 depicts an example content generation system 200 configured to (and/or including circuitry configured to) implement a system for, annotating, augmenting, and/or generating data. The content generation system 200 may include at least one computing system 202 configured to implement all or portions of the systems and methods of the present disclosure explained below in more detail. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. Various components of the system 200 may be implemented with same or different circuitry.

During operation, the CPU 206 may execute stored program instructions that are retrieved from the memory unit 208. The stored program instructions may include software that controls operation of the CPU 206 to perform the operation described herein. In some embodiments, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store one or more machine learning models (e.g., represented in FIG. 2 as the machine learning model 210) or algorithms, a training dataset 212 for the machine learning model 210, raw source dataset 216, etc.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement the machine learning model 210 to analyze the raw source dataset 216. For example, the CPU 206 and/or other circuitry may implement the machine learning model 210. The raw source dataset 216 may include raw or unprocessed sensor data that may be representative of an input dataset for a machine learning system. The raw source dataset 216 may include audio, images, video, video segments, audio, text-based information, and raw or partially processed sensor data (e.g., a radar map of objects). In some embodiments, the machine learning model 210 may include a deep-learning or neural network algorithm that is designed to perform a predetermined function. For example, the neural network algorithm may be configured to identify events or objects based on audio data.

The computer system 202 may store the training dataset 212 for the machine learning model 210. The training dataset 212 may represent a set of previously constructed data for training the machine learning model 210. The training dataset 212 may be used by the machine learning model 210 to learn various conditions and other factors (e.g., weighting factors) associated with an ML algorithm. The training dataset 212 may include a set of source data that has corresponding outcomes or results that the machine learning model 210 tries to duplicate via the learning process.

The machine learning model 210 may be operated in a learning mode using the training dataset 212 as input. The machine learning model 210 may be executed over a number of iterations using the data from the training dataset 212. With each iteration, the machine learning model 210 may update internal weighting factors based on the achieved results. For example, the machine learning model 210 can compare output results (e.g., generated content) with those included in the training dataset 212. Since the training dataset 212 includes the expected results, the machine learning model 210 can determine when performance is acceptable. After the machine learning model 210 achieves a predetermined performance level (e.g., 100% agreement with the outcomes associated with the training dataset 212), the machine learning model 210 may be executed using data that is not in the training dataset 212. The trained machine learning model 210 may be applied to new datasets to generate content. The machine learning model 210 may include an audio generation model trained in accordance with systems and methods of the present disclosure.

The machine learning model 210 may be configured to identify a particular feature in the raw source data 216. The raw source data 216 may include a plurality of instances or input dataset for which output results are desired (e.g., audio data, an audio stream, an image, a video stream or segment including audio data, etc.). For example only, the machine learning model 210 may be configured to identify object, features, or events in an audio segment based on audio data. In some examples, the machine learning model 210 may be configured to annotate identified objects, features, or events. The machine learning model 210 may be configured to perform audio generation according to the principles of the present disclosure. The machine learning model 210 may be programmed to process the raw source data 216 to identify the presence of the particular features. The machine learning model 210 may be configured to identify a feature in the raw source data 216 as a predetermined feature. The raw source data 216 may be derived from a variety of sources. For example, the raw source data 216 may be actual input data collected by a machine learning system. The raw source data 216 may be machine generated for testing the system. As an example, the raw source data 216 may include raw audio data, audio data from a microphone, etc.

In an example, the machine learning model 210 may process raw source data 216 and output audio data including one or more indications of an identified feature or event. The machine learning model 210 may generate a confidence level or factor for each output generated. For example, a confidence value that exceeds a predetermined high-confidence threshold may indicate that the machine learning model 210 is confident that the identified event (or feature) corresponds to the particular event. A confidence value that is less than a low-confidence threshold may indicate that the machine learning model 210 has some uncertainty that the particular feature is present.

Figure 3A:
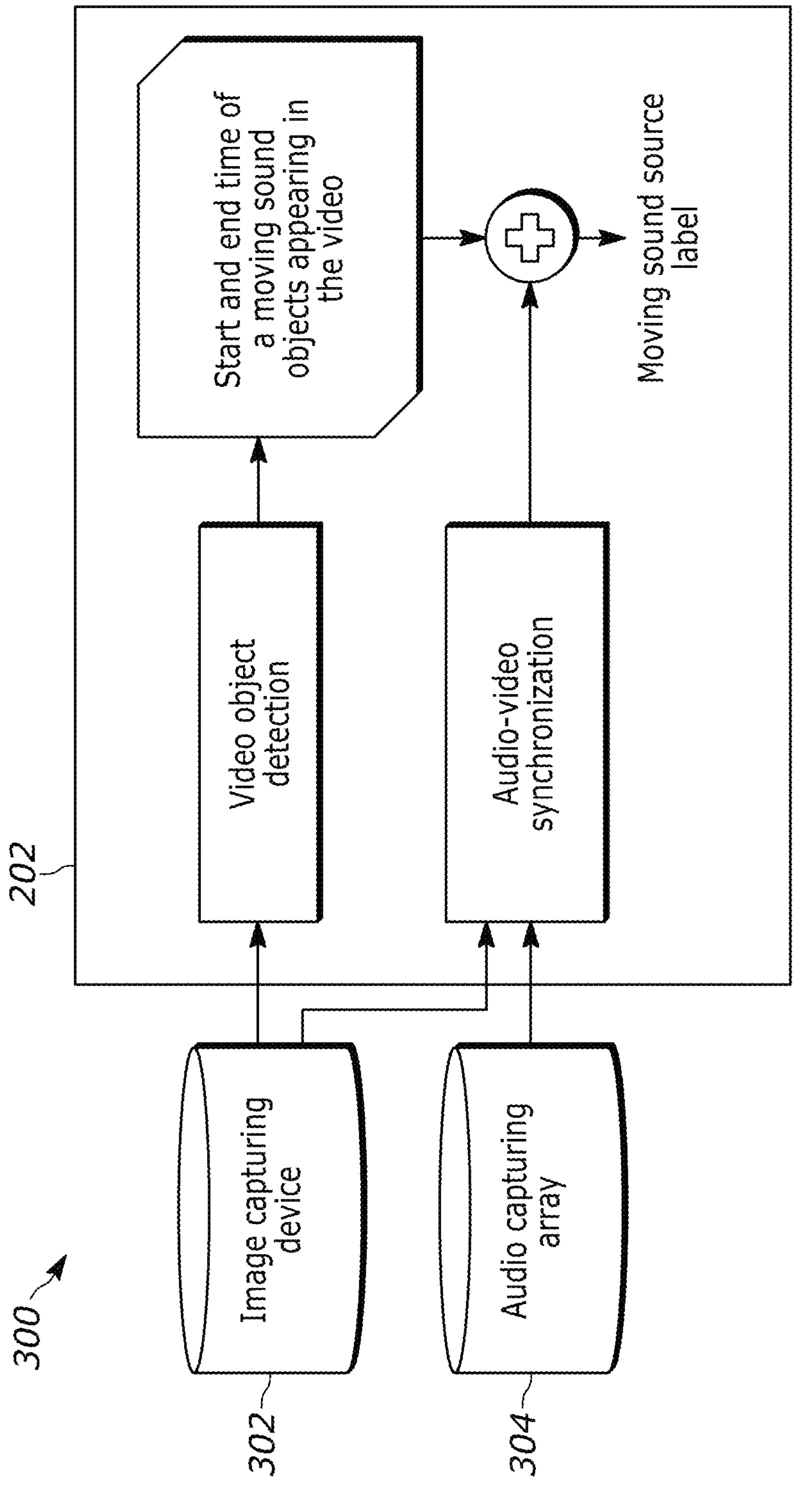
FIG. 3A generally illustrates an audio data labeling system according to the principles of the present disclosure.
Figure 3B:
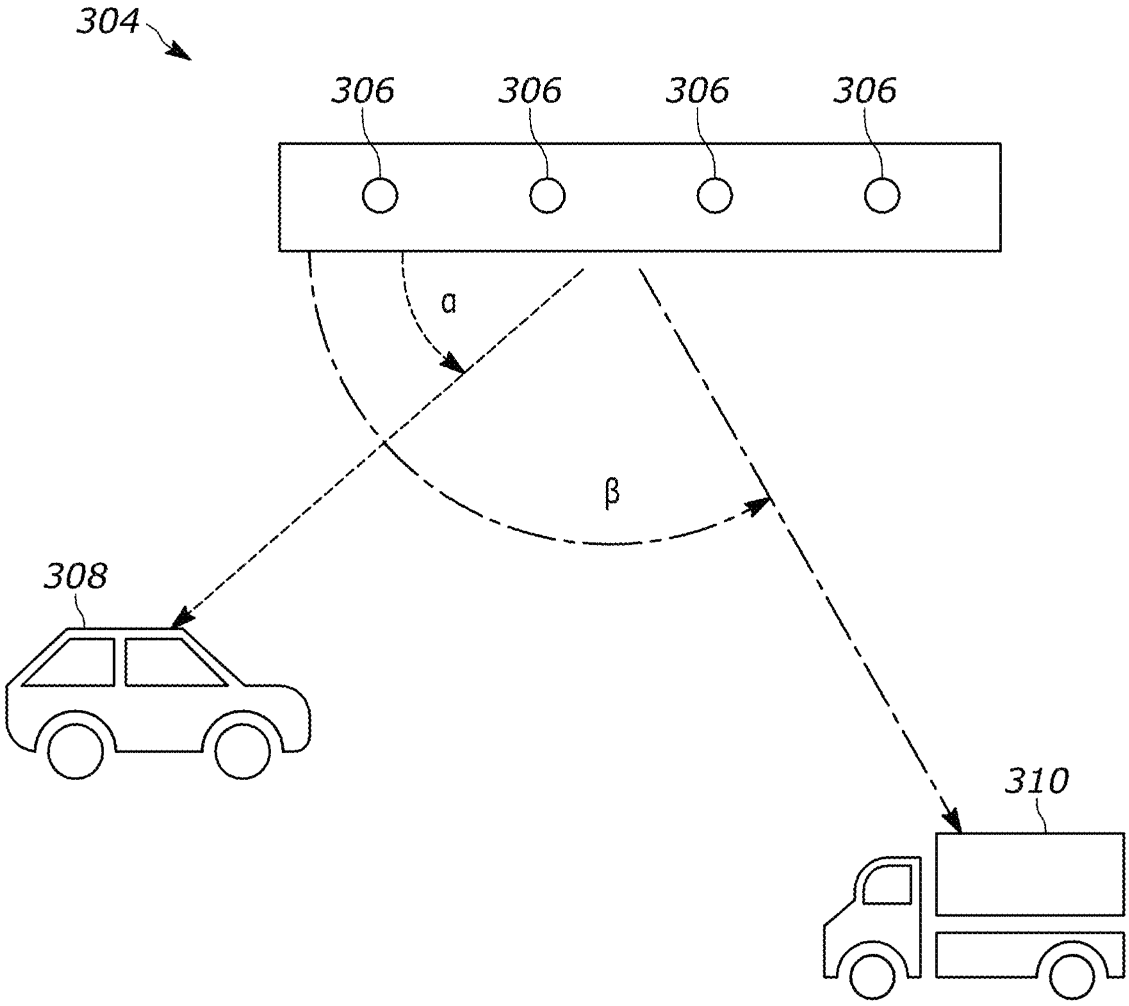
FIG. 3B generally illustrates a portion of a data capturing system according to the principles of the present disclosure.

As is generally illustrated in FIGS. 3A and 3B, an example system 300 may include an image (e.g., image and/or video) capturing device 302, an audio capturing array 304, and the computing system 202. The system may receive, from the image capturing device 302, video stream data associated with a data capture environment. The system 202 may be configured to perform video object detection to identify one or more objects in corresponding images of the video stream data. The system 202 may receive, from the audio capturing array 304, audio stream data that corresponds to at least a portion of the video stream data. The audio capturing array 304 may include one or more microphones 306 or other suitable audio capturing devices. The systems and methods described herein may be configured to label, using output from at least a first machine learning model (e.g., such as the machine learning model 210 or other suitable machine learning model configured to provide output including one or more object or event detection predictions), at least some objects of the video stream data and/or audio stream data.

The system 202 may calculate (e.g., using at least one probabilistic-based function or other suitable technique or function), based on at least one data capturing characteristic, at least one offset value for at least a portion of the audio stream data that corresponds to at least one labeled object of the video stream data. The system 202 may synchronize, using at least the at least one offset value, at least a portion of the video stream data with the portion of the audio stream data that corresponds to the at least one labeled object of the video stream data. The at least one data capturing characteristic may include one or more characteristics of the at least one image capturing device, one or more characteristics of the at least one audio capturing array, one or more characteristics corresponding to a location of the at least one image capturing device relative to the at least one audio capturing array, one or more characteristics corresponding to a movement of an object in the video stream data, one or more other suitable data capturing characteristics, or a combination thereof.

The system 202 may label, using one or more labels of the labeled objects of the video stream data and the at least one offset value, at least the portion of the audio stream data that corresponds to the at least one labeled object of the video stream data. Each respective label may include an event type, an event start indicator, and an event end indicator. The system 202 may generate training data using at least some of the labeled portion of the audio stream data. The system 202 may train a second machine learning model using the training data. The system 202 may detect, using the second machine learning model, one or more sounds associated with audio data provided as input to the second machine learning model. The second machine learning model may include any suitable machine learning model and may be configured to perform any suitable function, such as those described herein with respect to FIGS. 4-11.

Figure 3C:
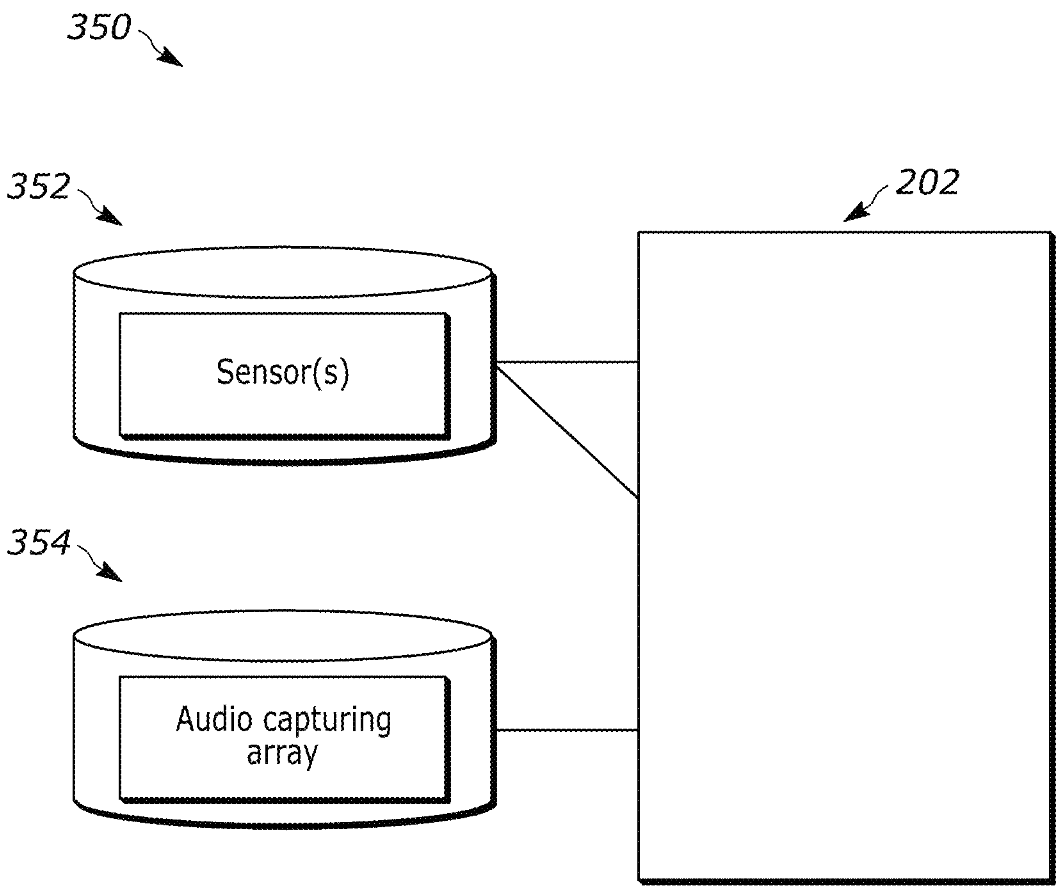
FIG. 3C generally illustrates an alternative audio data labeling system, according to the principles of the present disclosure.

In some embodiments, as is generally illustrated in FIG. 3C, the computing system 202 may be configured to label audio data based on sensor data received from one or more sensors, such as those described herein or any other suitable sensor or combination of sensors. The system 202 may receive, from the audio capturing array 354 or any suitable audio capturing device, such as one or more of the microphones 306 or other suitable audio capturing device, audio stream data associated with a data capture environment. It should be understood that the audio capturing array 354 may include features similar to those of the audio capturing array 304 and may include any suitable number of audio capturing devices. The system 202 may receive, from at least one sensor (e.g., such as the sensor 352) that is asynchronous relative to the audio capturing array 354, sensor data associated with the data capture environment. The sensor 354 may include at least one of an induction coil, a radar sensor, a LiDAR sensor, a sonar sensor, an image capturing device, any other suitable sensor, or a combination thereof. The audio capturing array 354 may be remotely located from the sensor 354, proximately located to the sensor 354, or located in any suitable relationship to the sensor 354.

The system 202 may identify, using output from at least a first machine learning model, such as the machine learning model 210 or other suitable machine learning model, at least some events in the sensor data. The machine learning model 210 may be configured to provide output including one or more event detection predictions based on the sensor data. The system 202 may synchronize at least a portion of the sensor data associated with the portion of the audio stream data that corresponds to the at least one event of the sensor data. The system 202 may label, using one or more labels extracted for respective events of the sensor data value, at least the portion of the audio stream data that corresponds to the at least one event of the sensor data. Each respective label may include an event type, an event start indicator, and an event end indicator. The system 202 may generate training data using at least some of the labeled portion of the audio stream data. The system 202 may train a second machine learning model using the training data. The system 202 may detect, using the second machine learning model, one or more sounds associated with audio data provided as input to the second machine learning model. The second machine learning model may include any suitable machine learning model and may be configured to perform any suitable function, such as those described herein with respect to FIGS. 4-11.

The audio generation systems and methods of the present disclosure (e.g., any of the systems 100, 200, etc.) are configured to train an audio generation model (e.g., the model 210) to modify and generate audio content based on text descriptions (e.g., perform data or audio augmentation) as described below in more detail.

In various use cases and applications, acquiring data during regular operational states (i.e., healthy conditions) is straightforward. However, obtaining faulty data for training machine learning models can be challenging or cost prohibitive. In certain instances, acquiring such data might be unfeasible until the physical device or system is deployed and actual faults occur. Numerous applications still contend with inadequate data for effective ML model training. To address the scarcity of audio signals representing fault conditions (or any desired conditions), the techniques of the present disclosure introduce a data generation technique for audio signals. These techniques include manipulating the original/reference audio signal using inputs from multiple modalities and conditions. These inputs can encompass textual descriptions, sample-style audio, or various conditions/modalities, providing a versatile solution.

The systems and methods of the present disclosure include a description manager configured to receive input queries or desired conditions of a physical device/machine/system to generate descriptions or information that are more relevant and necessary for an audio manipulator. The audio manipulator (e.g., an audio manipulator or manipulation module, circuitry, etc.) creates audio content by manipulating the input reference audio based on the guidance and information provided by the description manager.

In an example where expert knowledge is unavailable, the description manager can employ an LLM as a shared knowledge base to gather comprehensive insights concerning the device and its anticipated behaviors. By delivering precise instructions or prompts to the LLM regarding the device, context, and the specific characteristics or behaviors of interest, the LLM can then generate textual descriptions or pertinent information. For instance, the LLM can address queries such as, “what types of sounds might a wind turbine produce in the presence of chipped faults in its bearings and gears?” This process serves to bridge the knowledge gap effectively.

Based on the obtained information about the device, the instructions provided to the LLM can be enriched by incorporating an extensive range of contextual details. These details may encompass factors such as constituent materials of the device, operational settings (e.g., within a vehicle or a factory), and so on. For example, a direction might state: “position the fuel pump within the front trunk of the vehicle, ensuring that the resulting audio accounts for the surrounding environmental sounds.” This approach ensures that the LLM generates outputs that align more realistically with the specified conditions.

In an example where expert knowledge or an applications knowledge base is accessible, the sought-after information about applications can be directly retrieved through querying. Subsequently, the LLM can be used to rephrase or restructure this knowledge into pertinent information that aligns with the requirements of the audio manipulation module. For example, by analyzing parameters such as operational duration, system present temperature, and other monitored metrics, users can anticipate potential deviations from normal behavior within the system.

In certain implementations, the description manager can leverage the capabilities of the LLM to transform the existing shared knowledge into more comprehensive insights that define the sought-after physical behaviors and attributes of the system. This involves converting the information into a format suitable for input into the audio manipulation module, achieved through crafting of prompts. One example instruction may be, “arrange the subsequent details into the subsequent structural outline . . . ”

In some implementations, the audio manipulation module includes: a reference audio encoder configured to for extract audio embeddings; a text encoder configured to extract text embeddings; a style encoder configured to extract style or mode embeddings; and an ML/DL model (e.g., a diffusion model) trained with conditioning on all embeddings shared within the latent space to manipulate the audio.

In certain variations, the audio manipulation module may also include: an image encoder configured to extract image embeddings; and a signal ‘X’ encoder (e.g., a haptic encoder) configured to extract X embeddings.

As used herein, an embedding refers to a numerical representation of objects in a continuous vector space, configured to capture semantic relationships between entities. In other words, an embedding maps items from a high dimensional discrete space, such as vocabulary words, onto a lower-dimensional continuous space. Here, items with similar meanings are positioned closer together based on their semantic similarity. Embeddings are commonly pretrained on extensive datasets using techniques such Word2Vec, Glove, or FastText, which analyze co-occurrence patterns of words in text or even extend across modalities like CLAP (for text and audio) or CLIP (Contrastive Language-Image Pre-Training; for text and image).

In certain implementations, various foundational models can be harnessed to derive pertinent embeddings for distinct modalities. For instance, models like wav2vec or Hierarchical Token-Semantic Audio Transformer (HT-SAT) can be used for audio data, while ROBERTa or T5 models can be used for text and Visual Geometry Group (VGG) or ResNet models can be used for image data. Some models may be configured to enable joint processing across multiple modalities, such as CLAP or CLIP.

In some examples, the reference or original (i.e., unmanipulated/augmented) audio might involve recordings taken during the typical or optimal operational state of a physical device or machine, such as the sound of a functioning fuel pump. Textual descriptions outlining key characteristics, such as “notable high-pitched tones with intermittent cracking noises” or “sound captured while the machine operates on a street amidst traffic sounds,” may be included/provided with the original audio. Furthermore, style audio clips can come into play, comprising samples that encapsulate sound patterns associated with the machine, such as squeals, brittleness, glitches, and the like. To bolster the contextual understanding, images can be introduced as supplementary components, providing pertinent insights into the surroundings and background environment. For instance, an image portraying the placement of the fuel pump in the front trunk while situated on a street may add valuable context.

In some implementations, when sample audio capturing the ambient environment or anticipated noises is accessible, a supplemental or duplicated encoder (such as the “style” encoder) may be used. This supplementary encoder is introduced to extract specific information pertaining to the environmental factors or noise characteristics, enhancing the generation process of the target audio.

In some implementations, when an additional modality is accessible, such as haptic or surface sensor data, the corresponding foundational model can be employed to extract the signal embedding. As an example, certain foundational models are adaptable to diverse modalities, as demonstrated by the utilization of a ResNet18 model tailored to process haptic data.

In some examples, the audio manipulation module is configured to receive or obtain the frequency spectrum (such as a spectrogram) of the audio as an input and subsequently produce a manipulated spectrogram as an output. In these examples, a vocoder used to reconstruct the audio waveform from the spectrogram.

In some examples, diffusion models may be used to provide speech generation, catering to both waveform and mel-spectrogram formats. Diffusion models may include two distinct processes: the forward process, which facilitates the transformation of the data distribution into a standard Gaussian distribution through the implementation of a predefined noise schedule; and the reverse process, responsible for the gradual generation of data samples from the noise, meticulously guided by an inference noise schedule. This approach ensures the production of data samples that align with the desired output.

In some implementations, all embeddings coexist within a shared space, containing valuable cross-modal information. During the generation phase, audio synthesis is initiated by subjecting the input audio representation to a denoising process, which serves as the initial step in the reverse process. This denoising process is conditioned on other cross-modal representations and progressively refines the generation of audio output.

In some generation implementations, the inclusion of weights within each condition can significantly enhance control over the generated data. This integration of weights not only amplifies the command over generated outcomes but also augments the diversity within the generated dataset.

In some examples, the data generated by manipulating the reference audio to simulate diverse faulty conditions can be effectively utilized to augment the training dataset for subsequent (e.g., downstream) machine learning or deep learning models. These downstream models may include tasks such as distinguishing between healthy and faulty data, predicting anomalous behaviors, translating the audio into another modality, such as torque data, and so on.

The techniques of the present disclosure may extend beyond generating merely fault data, including any type of negative data generation. Further, these techniques avoid the necessity for domain-specific feature extraction or preprocessing, allowing implementation across various audio applications. In certain implementations, the generated data may be used for training experts or offering insights into audio signals that have not previously occurred.

As described below in more detail, the audio generation systems and methods of the present disclosure implement one or more of the techniques described above for data generation and fault diagnosis. For example, augmented audio signals (e.g., synthetic audio data) are generated through the manipulation of input or reference audio (an 'x' signal). This manipulation is conditioned on textual descriptions, styles, and/or any conditions that can be extracted from the 'x' signal or modality. These techniques are used to create the synthetic audio data for the training of machine learning-based models. The synthetic audio data is produced through the application of diverse data augmentation approaches to the pre-existing physical data (e.g., original, input, or reference audio). By using an expanded dataset including the synthetic data, accuracy and resilience in predictive maintenance systems can be enhanced, improving effectiveness and dependability for classifying healthy and faulty states, predicting faults, and so on.

An example audio generation system includes a description manager and an audio manipulation module. The description manager is configured to generate textual descriptions of audio that outline the characteristics or properties of manipulated audio. To achieve this, the description manager uses an LLM configured to generate descriptive text based on (i) instructions derived from the physical device or system that generates the audio signal and (ii) the conditions under which the audio is to be manipulated. Further, the description manager may use the LLM to organize or rephrase information sourced from experts or a knowledge base into a desired structure.

The audio manipulation module includes various encoders, including audio, text, style, and other encoders associated with desired conditions. The audio manipulation module implements a trained model (such as a diffusion model) that operates while being conditioned on text embeddings, style embeddings, and other data embeddings within a continuous latent space. Given a pre-trained model, the process can be reversed, facilitating the generation of manipulated audio.

Figure 4A:
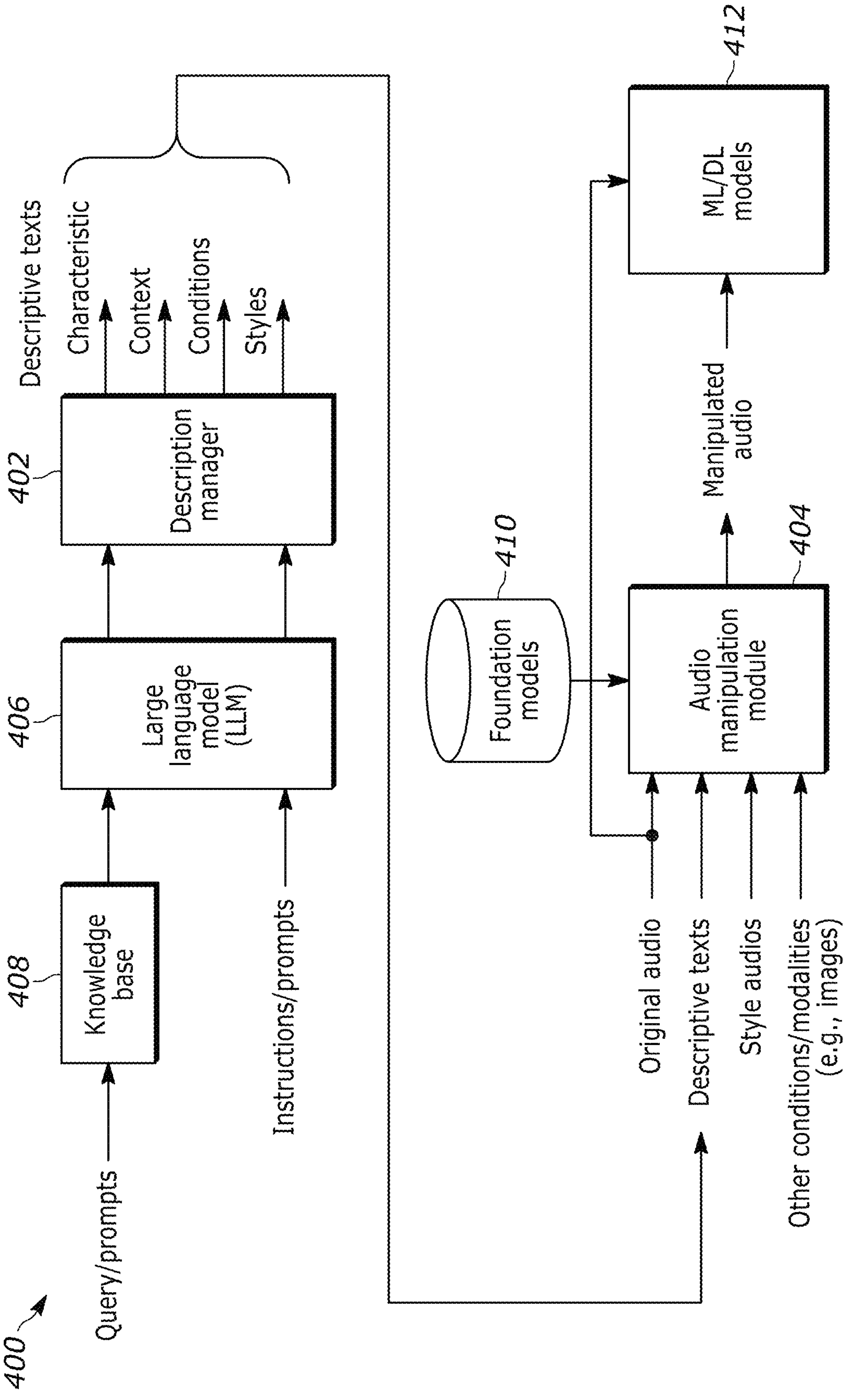
FIG. 4A illustrates an example audio generation system configured to perform audio generation and augmentation according to the present disclosure.

FIG. 4A illustrates an example audio generation system 400 configured to perform audio generation and augmentation according to the present disclosure. For example, one or more computing devices, processors, or processing devices are configured to execute instructions to implement the functions of the audio generation system 400, such as one or more of the processors of the systems (e.g., 100, 200, etc.) described herein.

The audio generation system includes a description manager 402 and an audio manipulation module 404. As described above, the description manager 402 is configured to generate textual descriptions of audio that outline the characteristics or properties of manipulated audio. For example, an LLM 406 is configured to generate text descriptions based on instructions or prompts derived from a physical device, machine, system, etc. that produces sounds and/or an audio signal. In some examples, the LLM 406 may also receive one or more inputs indicating the conditions under which the audio is to be manipulated to further determine the text descriptions generated by the LLM 406. The conditions may include, but are not limited to, information such as constituent materials of the device, operational settings, location or environment, etc.

In some example, the LLM 406 may be configured to organize or rephrase information sourced from experts or a knowledge base 408 into a desired structure. The knowledge base 408 may be a knowledge base of information for a particular device, components, failures, etc., and may include textual descriptions of behavior ("healthy" sounds, failure sounds, descriptions of sounds for particular failures, and so on) for the device and components. For example, queries/prompts regarding the device, context, and the specific characteristics or behaviors of interest are input to the knowledge base 408, which can then be provided to the LLM 406 to generate textual descriptions or information to be used by the description manager 402. For example, the LLM 406 can generate textual descriptions in response to queries such as, "what types of sounds might a wind turbine produce in the presence of chipped faults in its bearings and gears?"

The description manager 402 receives the textual descriptions from the LLM 406 to transform existing shared knowledge into more comprehensive insights that define the sought-after physical behaviors and attributes of the device. For example, the description manager 402 is configured to convert the textual descriptions received from the LLM 406 into a format suitable for input into the audio manipulation module 404, referred to herein as "descriptive text inputs" For example, the descriptive text inputs may include one or more categories or types of information, such as characteristics, context, conditions, and styles. For example, the characteristics may indicate one or more characteristics of the audio signal to be generated/manipulated (e.g., "high-pitched whining noise with cracking"). Conversely, conditions and context may indicate the device making the sound, location, environment, and other conditions (e.g., "engine sound with road traffic"). Style may indicate sound characteristics such as, timbre, pitch, emotional content, etc.

The audio manipulation module 404 is configured to generate audio data (e.g., manipulated audio) based on original audio based on the descriptive text inputs received from the description manager 402 and, in some examples, one or more other inputs such as style audios (e.g., audio/sound samples or examples provided by users) and other conditions or modalities (e.g., images). For example, the audio manipulation module 404 includes or implements various encoders, such as audio encoders, text encoders, style encoders, and so on. The audio manipulation module 404 is configured to implement a trained model (such as a diffusion model) that operates while being conditioned on text embeddings, style embeddings, and other data embeddings within a continuous latent space. The audio manipulation module 404 may further include or implement one or more foundational models 410, such as wav2vec or Hierarchical Token-Semantic Audio Transformer (HT-SAT) models, ROBERTa or T5 models, Visual Geometry Group (VGG) or ResNet models, etc.

In this manner, the audio manipulation module 404 is configured to generate/synthesize manipulated audio (e.g., a manipulated version of the original audio) using the descriptive text inputs. In other words, original, "healthy" audio is manipulated to include audio features indicative of various faults (e.g., as described by the descriptive text inputs) associated with the corresponding device. For example, based on the descriptive text inputs, the audio manipulation module 404 adds audio features or signatures indicative of various faults (e.g., grinding, squeaking, whirring, knocking, clicking, higher frequencies, lower frequencies, and so on). In some examples, the manipulated audio may be generated using an audio synthesizing device such as a vocoder.

Observed audio (e.g., actual audio obtained during operation of the device, such as the original audio, which may contain both healthy audio and audio including various faults) and the manipulated audio (e.g., manipulated audio including fault data indicative of one or more faults) may be provided as inputs to train one or more ML/DL models 412. In this manner, the ML/DL models 412 can be trained to detect, identify, and diagnose faults in devices or systems based on audio data obtained during operation of the devices.

Figure 4B:
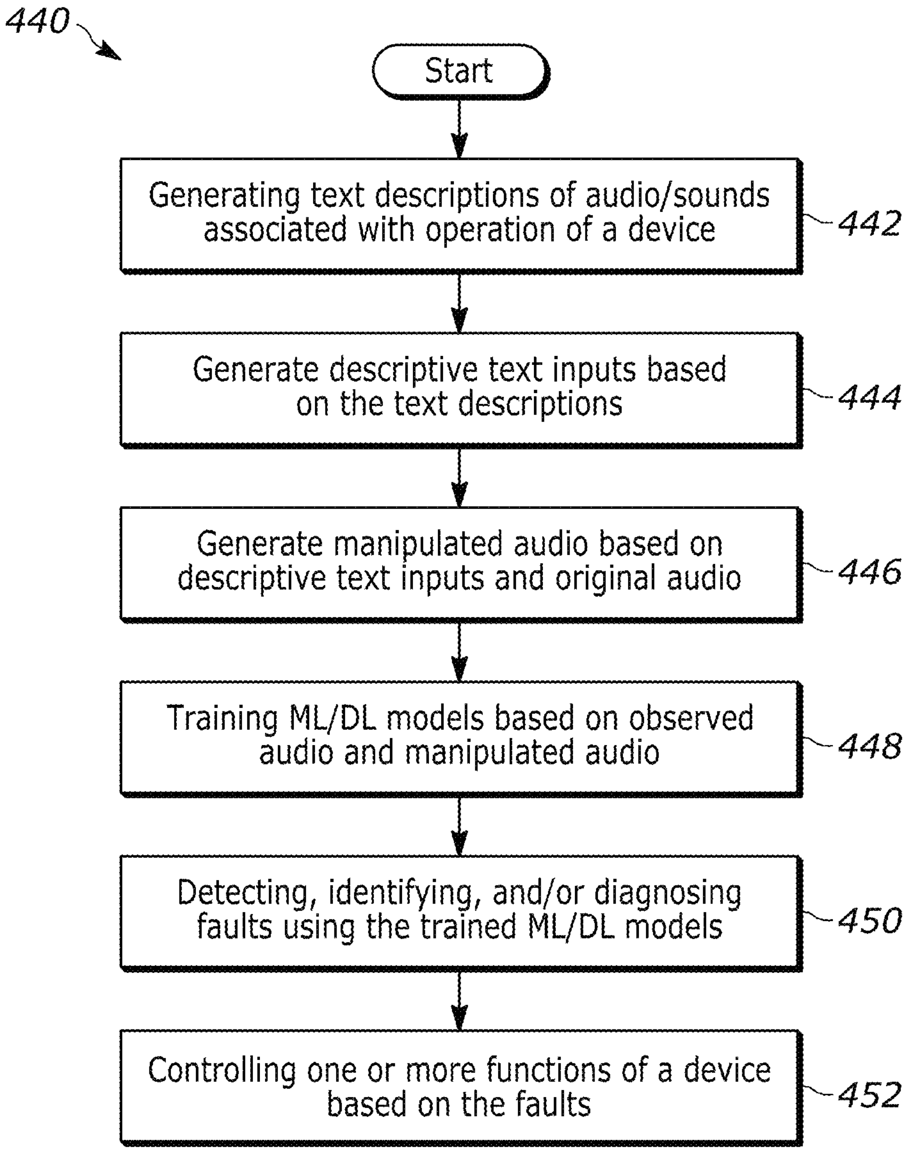
FIG. 4B illustrates steps of an example method for implementing an audio generation model according to the principles of the present disclosure.

FIG. 4B illustrates steps of an example method 440 for implementing (e.g., training and subsequently performing audio generation with) an audio generation model according to the principles of the present disclosure. For example, one or more processors or processing devices are configured to execute instructions to implement the method 440, such as one or more of the processors of the systems described herein.

At 442, the method 440 includes generating, using an LLM, text descriptions of audio/sounds associated with operation of a device, machine, system, etc., including descriptions of faults associated with device, sounds caused by the faults, causes of faults (e.g., components causing particular fault sounds), and so on.

At 444, the method 440 includes generating descriptive text inputs based on the text descriptions generated by the LLM. For example, the descriptive text inputs include various categories associated with operation of a particular device and corresponding audio produced by operation of the device, such as characteristics (e.g., sound characteristics), conditions, context, style, etc. as described herein.

At 446, the method 440 includes generating manipulated audio based on at least the descriptive audio and original audio (e.g., an audio signal or audio data obtained during operation of the device or a similar device). For example, based on the descriptive text inputs, audio features or signatures indicative of various faults are added to the original audio to obtain manipulated (synthesized) audio or audio data.

At 448, the method 440 includes training one or more ML or DL models using the manipulated audio and original (e.g., observed) audio.

At 450, the method 440 includes, using the trained ML or DL models, detecting, identifying, and/or diagnosing faults devices based on audio data obtained during operation of the devices (i.e., observed audio data), in real-time and/or using previously recorded audio data.

At 452, the method 440 includes controlling one or more functions of a device, system, machine, etc. based on detected or diagnosed faults. For example, information regarding faults can be used for various downstream tasks, such as control or adjustment of operational parameters or functions of devices, stopping operation of devices, generating alerts to operators of devices, storing and/or transmitting data indicating that one or more faults were diagnosed, etc. In some examples, the method 440 includes controlling functions of any of the systems described below in FIGS. 5-11.

Figure 5:
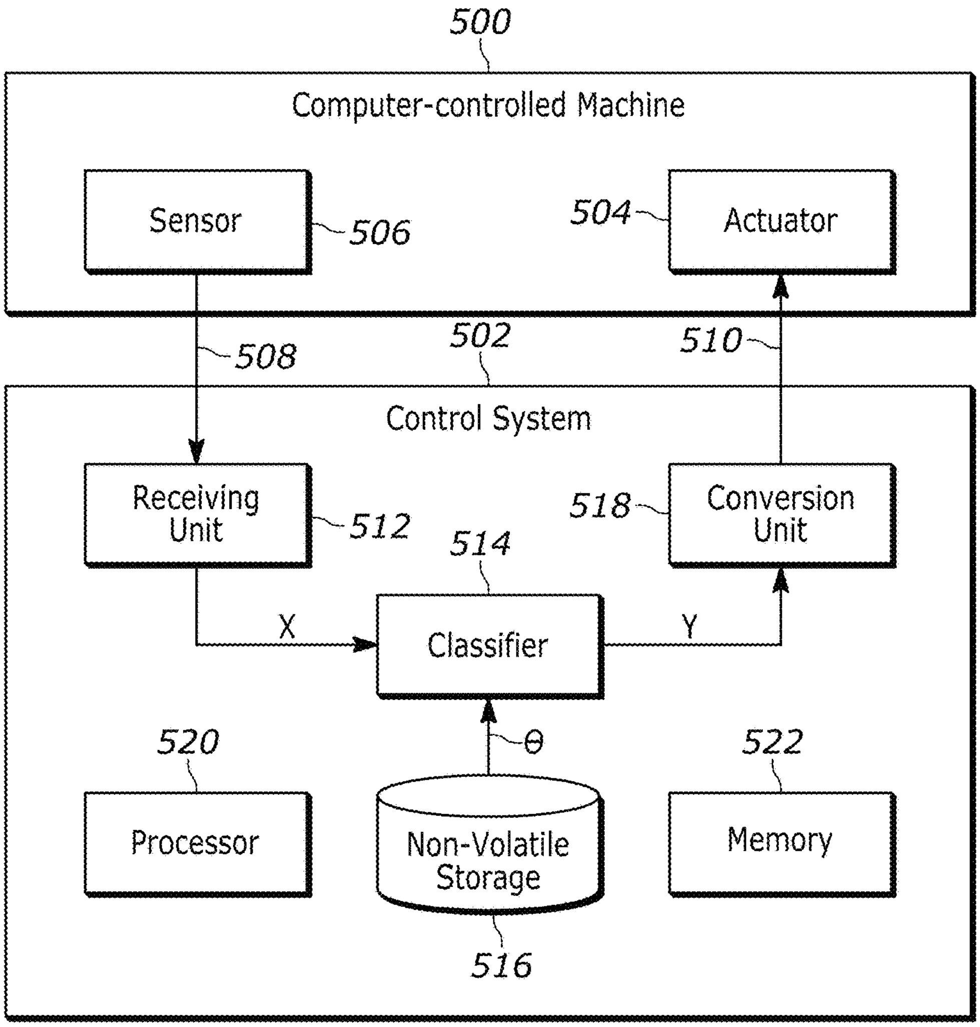
FIG. 5 illustrates a schematic diagram of an interaction between a computer-controlled machine and a control system according to the principles of the present disclosure.

FIGS. 5-11 depict example systems and devices that may implement audio generation models according to the present disclosure. FIG. 5 depicts a schematic diagram of an interaction between a computer-controlled machine 500 and control system 502. In an example, the control system 502 is configured to control the computer-controlled machine 500 by executing audio generation model in accordance with the principles of the present disclosure. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic, and motion sensors. In some embodiments, sensor 506 is an audio sensor configured to sense sounds (audio or sound data) in an environment proximate to computer-controlled machine 500. An audio generation model according to the present disclosure may perform audio generation using the audio data as described herein.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to produce each input signal x. Input signal x may include data corresponding to an image recorded by sensor 506.

Control system 502 includes classifier 514. Classifier 514 may be configured to classify input signals x into one or more labels using a machine learning (ML) algorithm, such as a neural network. For example, the classifier 514 corresponds to the classifier 408 described above. Classifier 514 is configured to be parametrized by parameters, such as those described above (e.g., parameter 0). Parameters 0 may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In some embodiments, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In some embodiments, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more anomaly detection methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the anomaly detection methodologies as disclosed herein. Non-volatile storage 516 may also include data supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
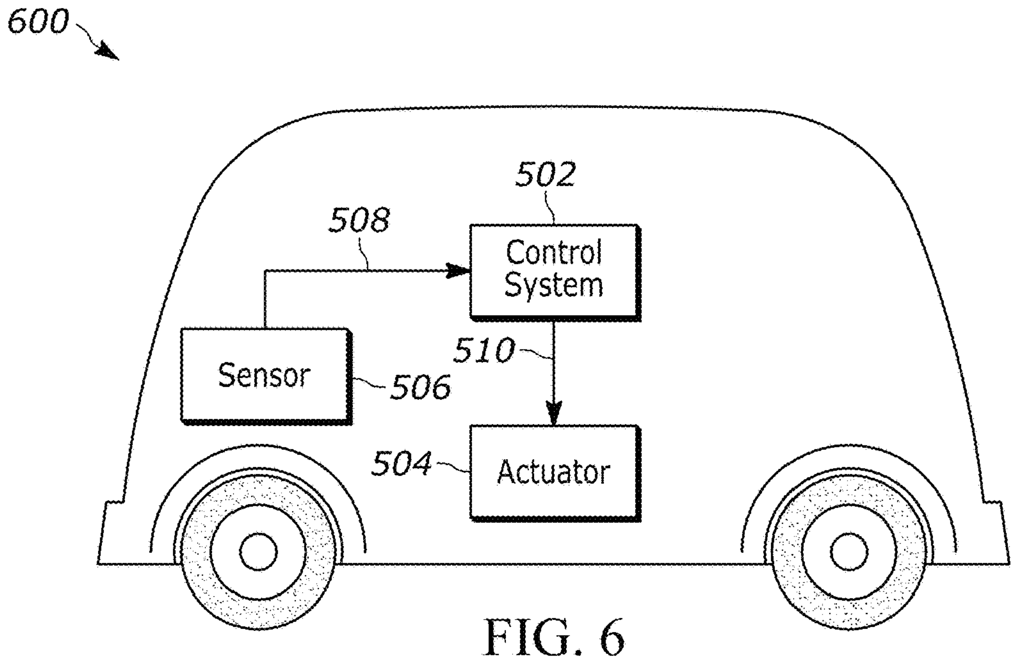
FIG. 6 illustrates a schematic diagram of the control system of FIG. 5 configured to control a vehicle, which may be a partially autonomous vehicle, a fully autonomous vehicle, a partially autonomous robot, or a fully autonomous robot, according to the principles of the present disclosure.

FIG. 6 depicts a schematic diagram of control system 502 configured to control vehicle 600, which may be an at least partially autonomous vehicle or an at least partially autonomous robot. In an example, the control system 502 is configured to control the vehicle 600 and/or perform various diagnosis techniques by executing an audio generation model in accordance with the principles of the present disclosure. Vehicle 600 includes actuator 504 and sensor

506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the proximity of objects to vehicle 600. Actuator control command 510 may be determined in accordance with this information. The actuator control command 510 may be used to avoid collisions with the detected objects.

In some embodiments, the vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In some embodiments where vehicle 600 is an at least partially autonomous robot, vehicle 600 may be a mobile robot that is configured to carry out one or more functions, such as flying, swimming, diving, and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In some embodiments, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical or audio sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
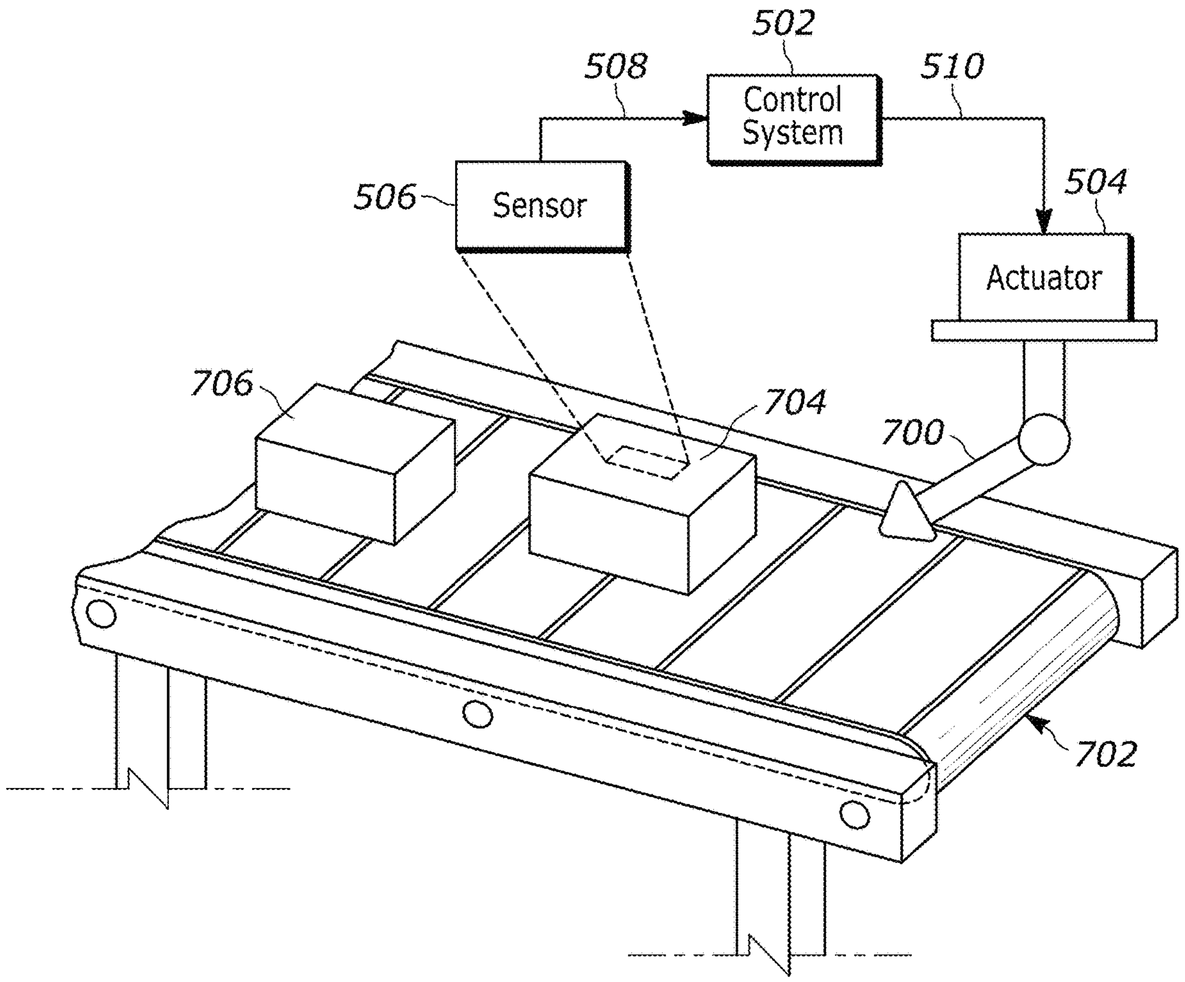
FIG. 7 illustrates a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., a manufacturing machine), such as a punch cutter, a cutter or a gun drill, of manufacturing system 702, such as part of a production line. Control system 502 may be configured to control actuator 504, which is configured to control system 700 (e.g., manufacturing machine). In an example, the control system 502 is configured to control the system 700 and/or perform various diagnose techniques by executing an audio generation model in accordance with the principles of the present disclosure.

Sensor 506 of system 700 (e.g., manufacturing machine) may be an audio sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
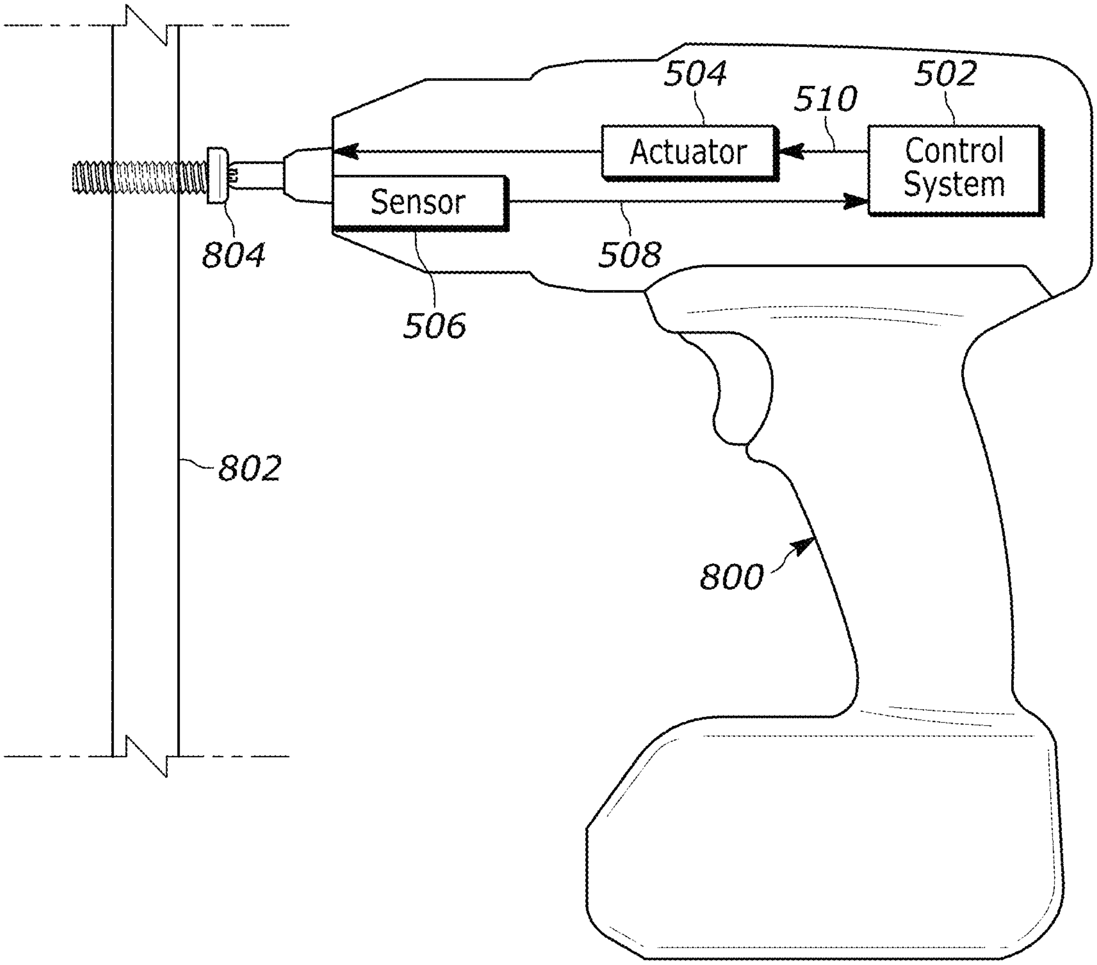
FIG. 8 illustrates a schematic diagram of the control system of FIG. 5 configured to control a power tool, such as a power drill or driver that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800. In an example, the control system 502 is configured to control the power tool 800 and/or perform various diagnosis techniques by executing an audio generation model in accordance with the principles of the present disclosure.

Sensor 506 of power tool 800 may be an audio sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
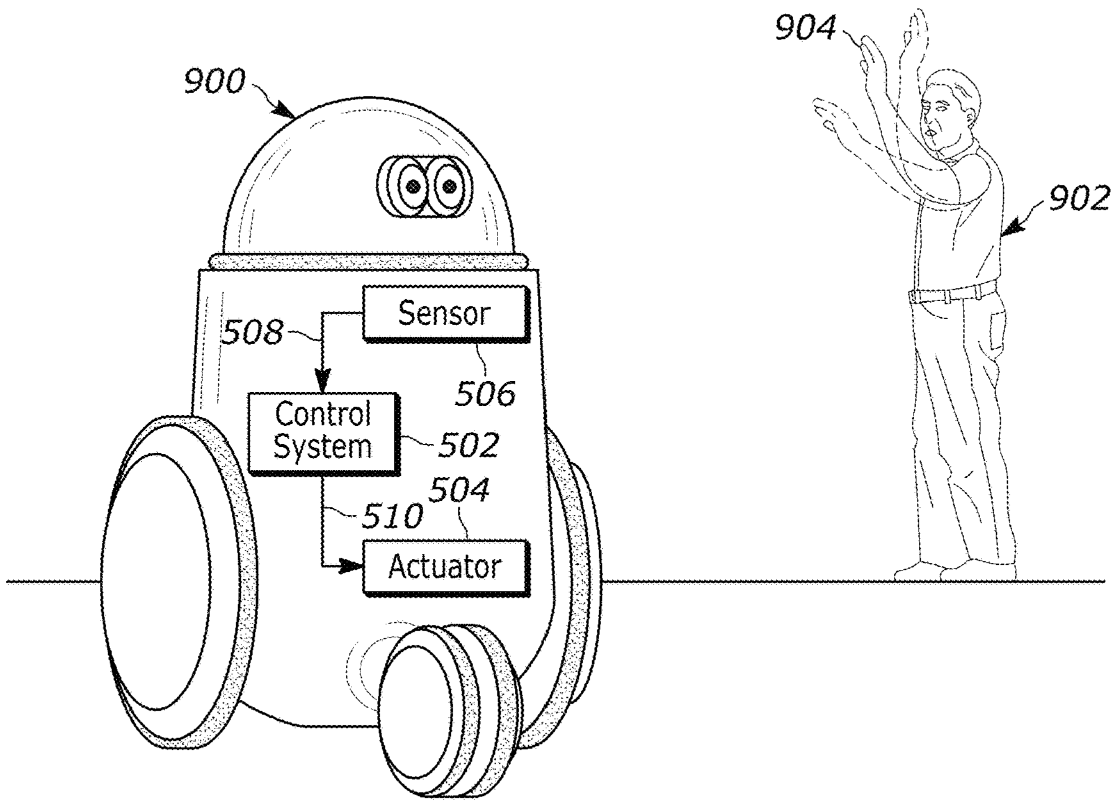
FIG. 9 illustrates a schematic diagram of the control system of FIG. 5 configured to control an automated personal assistant.

FIG. 9 depicts a schematic diagram of control system 502 configured to control an automated personal assistant 900 (e.g., a robot). Control system 502 may be configured to control actuator 504, which is configured to control automated personal assistant 900. Automated personal assistant 900 may be configured to control a domestic appliance, such as a washing machine, a stove, an oven, a microwave or a dishwasher. In an example, the control system 502 is configured to control the automated personal assistant 900 and/or perform various diagnosis techniques by executing an audio generation model in accordance with the principles of the present disclosure.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands

510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
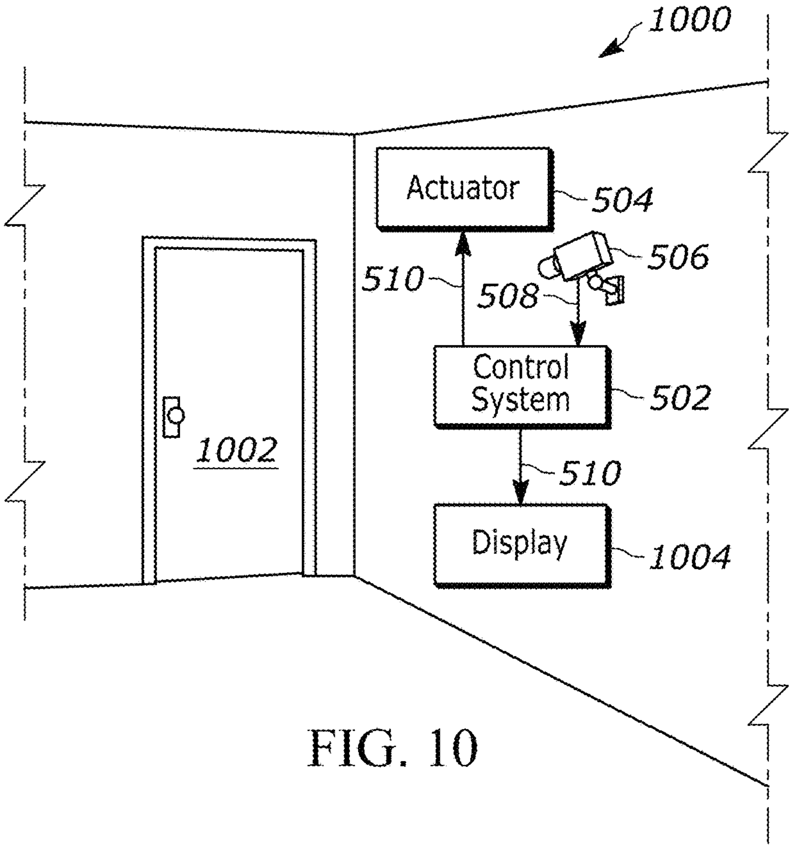
FIG. 10 illustrates a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face. In an example, the control system 502 is configured to control the monitoring system 1000 and/or perform various diagnosis techniques by executing an audio generation model in accordance with the principles of the present disclosure.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In some embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
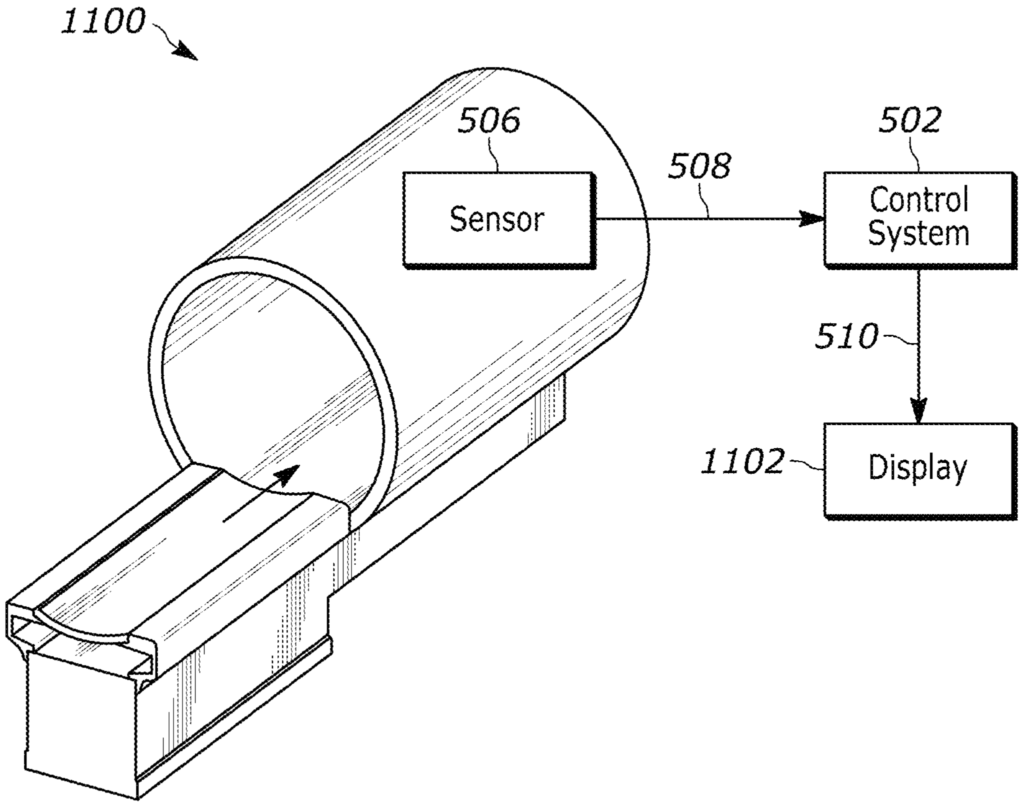
FIG. 11 illustrates a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. In an example, the control system 502 is configured to control the imaging system 1100 and/or perform various diagnosis techniques by executing an audio generation model in accordance with the principles of the present disclosure. Sensor 506 may, for example, be an imaging sensor and/or an audio sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of generating audio to obtain manipulated audio data that includes one or more audio features indicative of faults, the method comprising, at one or more processing devices:

receiving textual descriptions of audio associated with operation of a device;

receiving audio data associated with the operation of the device;

generating, based on the textual descriptions, descriptive text inputs of audio features associated with the operation of the device, wherein the descriptive text inputs include at least one of audio characteristics of faults associated with the operation of the device, contextual information associated with the operation of the device, and conditions associated with the operation of the device;

generating the manipulated audio data based on the descriptive text inputs and the audio data, wherein the manipulated audio data includes the one or more audio features indicative of faults associated with the descriptive text inputs;

training a machine learning (ML) model to diagnose the faults using the manipulated audio data, wherein the ML model is trained to generate an output indicative of the faults based on audio data obtained during the operation of the device; and based on convergence during the training, outputting a trained ML model configured to generate the output indicative of the faults.

2. The method of claim 1, further comprising controlling one or more functions of the device based on the output.

3. The method of claim 2, wherein controlling the one or more functions includes at least one of controlling or adjusting operational parameters of the device, stopping operation of the device, and generating an alert.

4. The method of claim 1, further comprising generating the textual descriptions using a large language model (LLM).

5. The method of claim 4, further comprising receiving, at the LLM, prompts from at least one of (i) a knowledge base and (ii) one or more users.

6. The method of claim 5, wherein the prompts include descriptions of audio features associated with faults in the operation of the device.

7. The method of claim 1, wherein training the ML model includes providing, to the ML model, observed audio data that includes (i) healthy audio data that does not include audio features indicative of the faults and (ii) faulty audio data that includes audio features indicative of the faults.

8. A computing device configured to generate audio to obtain manipulated audio data that includes one or more audio features indicative of faults, the computing device including a processing device configured to execute instructions stored in memory to:

receiving textual descriptions of audio associated with operation of a device;

receiving audio data associated with the operation of the device;

generating, based on the textual descriptions, descriptive text inputs of audio features associated with the operation of the device, wherein the descriptive text inputs include at least one of audio characteristics of faults associated with the operation of the device, contextual information associated with the operation of the device, and conditions associated with the operation of the device;

generating the manipulated audio data based on the descriptive text inputs and the audio data, wherein the manipulated audio data includes one or more audio features indicative of faults associated with the descriptive text inputs;

training a machine learning (ML) model to diagnose the faults using the manipulated audio data, wherein the ML model is trained to generate an output indicative of the faults based on audio data obtained during the operation of the device; and based on convergence during the training, outputting a trained ML model configured to generate the output indicative of the faults.

9. The computing device of claim 8, wherein the processing device is further configured to execute the instructions to control one or more functions of the device based on the output.

10. The computing device of claim 9, wherein controlling the one or more functions includes at least one of controlling or adjusting operational parameters of the device, stopping operation of the device, and generating an alert.

11. The computing device of claim 8, wherein the processing device is further configured to execute the instructions to generate the textual descriptions using a large language model (LLM).

12. The computing device of claim 11, wherein the processing device is further configured to execute the instructions to receive, at the LLM, prompts from at least one of (i) a knowledge base and (ii) one or more users.

13. The computing device of claim 12, wherein the prompts include descriptions of audio features associated with faults in the operation of the device.

14. The computing device of claim 8, wherein training the ML model includes providing, to the ML model, observed audio data that includes (i) healthy audio data that does not include audio features indicative of the faults and (ii) faulty audio data that includes audio features indicative of the faults.

15. A system configured to generate audio to obtain manipulated audio data that includes one or more features indicative of faults corresponding to operation of a computer-controlled machine, the system comprising:

a control system configured to receive textual descriptions of audio associated with the operation of the computer-controlled machine, receive audio data associated with the operation of the computer-controlled machine, generate, based on the textual descriptions, descriptive text inputs of audio features associated with the operation of the computer-controlled machine, wherein the descriptive text inputs include at least one of audio characteristics of faults associated with the operation of the device, contextual information associated with the operation of the computer-controlled machine, and conditions associated with the operation of the computer-controlled machine, generate the manipulated audio data based on the descriptive text inputs and observed audio data corresponding to the operation of the computer-controlled machine, wherein the manipulated audio data includes one or more audio features indicative of faults associated with the descriptive text inputs, and train a machine learning (ML) model to diagnose the faults using the manipulated audio data, wherein the ML model is trained to generate an output indicative of the faults based on audio data obtained during the operation of the computer-controlled machine, and output a control signal based on the output; and an actuator configured to control the operation of the computer-controlled machine based on the control signal.

16. The system of claim 15, controlling the operation of the computer-controlled machine includes at least one of (i) controlling or adjusting operational parameters of the computer-controlled machine and (ii) stopping operation of the computer-controlled machine.

17. The system of claim 15, wherein the control system is further configured to generate an alert based on the output.

18. The system of claim 15, further comprising a large language model (LLM) configured to generate the textual descriptions.

19. The system of claim 18, wherein the LLM is configured to generate the textual descriptions in response to prompts received from at least one of (i) a knowledge base and (ii) one or more users.

20. The system of claim 19, wherein the prompts include descriptions of audio features associated with faults in the operation of the computer-controlled machine.

* * * * *